Patented June 23, 1925.

1,543,310

UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR THE PRELIMINARY TREATMENT OF CELLULOSE PRIOR TO ESTERIFICATION.

No Drawing. Application filed October 3, 1924. Serial No. 741,403.

*To all whom it may concern:*

Be it known that I, JEAN ALTWEGG, residing at Lyon, France, a citizen of the Confederation of Switzerland, have invented certain new and useful Improvements in Processes for the Preliminary Treatment of Cellulose Prior to Esterification, of which the following is a specification.

The most rational method for esterifying cellulose consists in treating it with fatty acids in the presence of catalytic agents. When applying the numerous methods advocated, it is found that certain cellulose materials are more difficult to esterify than others. Particularly so are celluloses which have received certain alkaline treatments before esterification. Among these may be mentioned cotton mercerized by a soda process, or cellulose obtained by a soda process from wood, straw or some gasses. The same may be said of celluloses having been submitted to purification or bleaching alkaline treatments. All these products oppose to esterification, to acetylation for instance, a more or less great resistance.

Means have already been proposed to render cellulose more easily acetylable. One of the best consists in wetting the cellulose with water before the acetylation process. This method, while giving excellent results, is very costly, as it is necessary to use large quantities of esterifying agents (acid anhydrides, acid halogenates) which are destroyed by the water. Wetting with water is not therefore a commercial process. Other inventors have proposed to immerse the cellulose before acetylation in large quantities of acetic acid; this method is much less efficient. Others propose to squeeze out most of the acid after impregnation; this necessitates special machinery without presenting great advantages.

I have discovered that cellulose can be rendered much more easily esterifiable by treating it with very small quantities of acetic acid, the quantities being so small that the cellulose material does not even appear to be wet. Closer study has disclosed the fact that, in order to obtain a satisfactory effect, the quantity of acetic acid must be chosen so that acetic acid of 60 to 90%, preferably 70 to 85%, is formed with the water retained hygroscopically by the cellulose.

Celluloses retain generally from 5 to 8% water; for 100 parts of cellulose, 10 to 40 parts of acetic acid must therefore be used. For instance, a mercerized cellulose retaining 8% water will be treated with 15 to 40% of acetic acid. The best effect will be obtained with 22% acetic acid, while a treatment with less than 15% or more than 50% will have but a very slight effect.

In order to carry on this treatment, the cellulose is wetted with the predetermined quantity of acetic acid. Stirring may be used to render the mass homogeneous, but it is quite superfluous to use mechanical means of impregnation, such as, for example, pressure or kneading. The effect is obtained in 1 to 2 hours. If the mass is not stirred, it is necessary to allow the acetic acid to distribute itself in the cellulose mass by diffusion and evaporation. In this latter case, the wet mass must be allowed to stand a little longer, 4, 12, or even, in certain cases, 24 hours. This reaction takes place at normal temperature; no useful purposes are served by causing the acid to react at a temperature above 30° C.

It is very surprising that such small quantities of acid are sufficient to render cellulose more readily esterifiable; particularly, it was not to be foreseen that there is a relation between the quantity of acid used for wetting and the water retained by the cellulose dried in air.

In practice this invention gives a means which is extremely simple and cheap, of rendering cellulose more easily esterifiable.

*Example 1.*—50 parts of mercerized cotton containing 8% moisture are wetted with 11 parts of acetic acid and gently stirred during two hours. To the cotton so prepared, 250 parts of acetic acid, containing ½ per cent of sulphuric acid, are added, and the whole is maintained for three hours at a temperature of 45° C., after which 150 parts of acetic anhydride are added, the temperature being kept between 50 and 60° C. After about a quarter of an hour, a very clear and very viscous liquid is obtained, which is an acetyl cellulose solution of great technical value.

By doing away with the preliminary treatmen with 11 parts of acetic acid, and operating as described, a clear solution cannot be obtained, but, even after several hours of heating at 50-60° C., only a turbid liquid losing rapidly all its viscosity is obtained.

*Example 2.*—Raw cellulose ("wood pulp") is purified, according to known methods, by treating it with a 17.5% solution of caustic soda. The pure cellulose thus obtained, dried in air, contains 7.5% moisture.

100 parts of this cellulose are moistened with 20 parts of acetic acid, and the mixture is allowed to stand for 20 hours. The cellulose, rendered in this manner easily esterifiable, is dipped into a mixture of 400 parts acetic acid and 300 parts of acetic anhydride. The catalyst, namely, 3 parts of sulphuric acid, is then added with precaution, the temperature being allowed to rise slowly to 60° C. and being maintained for some time at this level. During this last phase, the cellulose dissolves, forming a perfect viscous solution.

By performing the same operations without having submitted the cellulose to the preliminary treatment with a small quantity of acetic acid, the cellulose does not dissolve; even when the quantity of acetic acid used in the preliminary treatment is increased from 20 parts to 50 parts, the dissolution is much more slow, and the final solution is not quite clear.

*Example 3.*—80 kilos of cotton bleached with sodium hypochlorite and containing 5.6% moisture after having been dried in air, is wetted, while moving it about gently, with 14 parts of pure acetic acid; after two hours, 800 parts of acetic acid are first added, then a mixture of 57 parts of acetic anhydride and 2.2 kilos of sulphuric acid, the temperature being maintained in the neighbourhood of 20° C. After two hours (approximately), 190 parts of acetic anhydride are further added, and the temperature is raised to 55° C. In 30 to 45 minutes, a solution is obtained which is perfect in every respect.

When doing away with the preliminary treatment, which is the object of this invention, it is not possible to obtain a proper solution, even in considerably lengthening the duration of the various phases of the operation or in increasing the quantity of the ingredients used.

What I claim and desire to secure by Letters Patent is:—

1. A process for rendering cellulose more easily esterifiable, consisting in treating it with a quantity of pure acetic acid such that it forms, with the water moisture retained by the cellulose, an acetic acid of concentration 60 to 90%.

2. A process for rendering cellulose more easily esterifiable, as claimed in claim 1, in which the concentration is 70 to 85%.

In testimony whereof I have signed my name to this specification.

JEAN ALTWEGG.